Jan. 7, 1941.    W. E. AMBERG ET AL    2,227,428
SANITARY SHIELD FOR PASTRY CONES
Filed Oct. 22, 1938
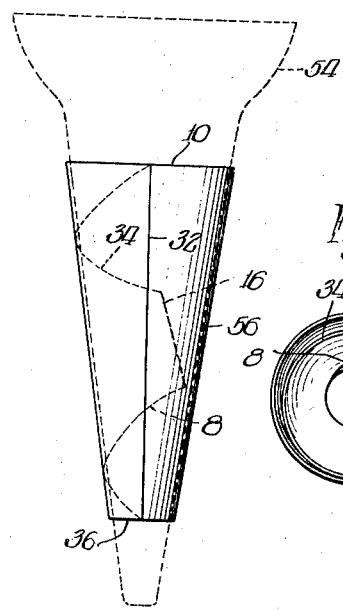
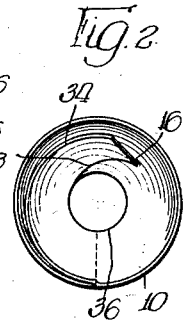
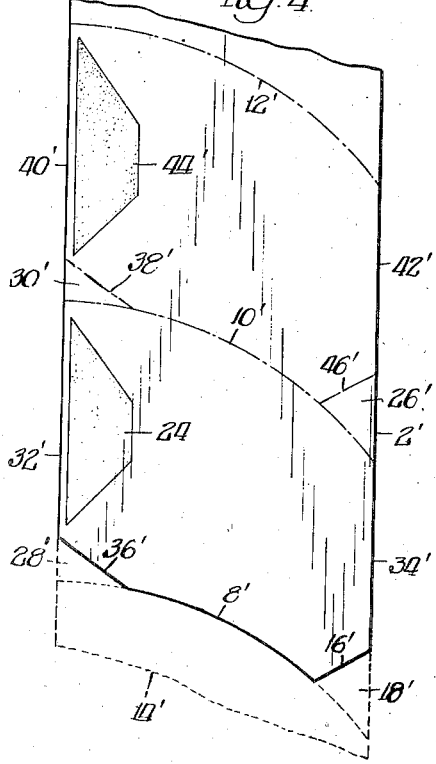
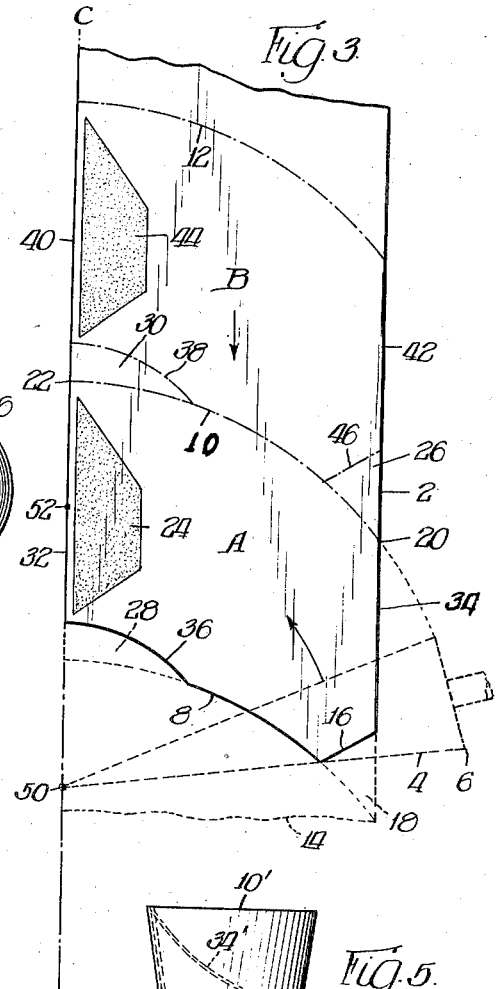
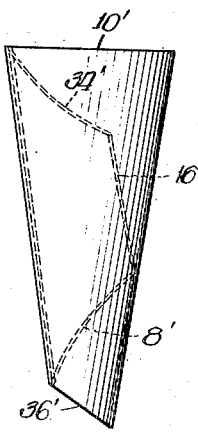
Inventors:
Walter E. Amberg,
Arthur S. Bowes,
Stephen W. Amberg,
BY Richard Spencer
ATTORNEY.

Patented Jan. 7, 1941

2,227,428

UNITED STATES PATENT OFFICE 2,227,428

SANITARY SHIELD FOR PASTRY CONES

Walter E. Amberg, Arthur S. Bowes, and Stephen W. Amberg, Chicago, Ill., assignors to Universal Paper Products Company, Chicago, Ill., a corporation of Illinois Application October 22, 1938, Serial No. 236,584

11 Claims. (Cl. 229—1.5)

This invention relates to a new and improved type of sanitary shield for pastry cones and to a new and improved method and means for the manufacture thereof.

As is well known, pastry cones are subjected to handling from numerous sources, for example, in packing them into containers as they come from the baking machines, in unpacking them at soda fountains to store them in other containers or dispensers from which they are taken one by one to be used in dispensing ice cream, in filling them with ice cream by the soda fountain clerk, and finally, by the user while eating the ice cream. Since these cones are edible and are customarily eaten with the ice cream, this handling is a constant source of contamination.

It is known in the art to provide various types of holders for ice cream cones as well as protectors suitable for wrapping the cones and adapted to protect the cones against contamination after they have been filled with ice cream. Such holders or wrappers for ice cream cones, as have heretofore been provided, may generally be divided into two classes, (1) protective coverings by means of which the user or consumer of the ice cream may hold the cone and thus prevent it from coming in contact with the hands, and (2) protective coverings adapted to cover the cone after it has been filled with ice cream in order that it may be carried from one place to another without contamination by dirt or dust.

One of the objects of the present invention is to provide a new and improved type of cone shield which may be applied to a pastry cone before or immediately after it is baked and which does not interfere with the stacking of the cone in nested relationship with other cones having similarly applied shields.

Another object of this invention is to provide a new and improved type of combined cone and protecting shield in which said shield is adapted to prevent contamination of those parts of the cone which are most frequently handled, at all times, from the time of baking the cone until the cone is filled with ice cream is dispensed to the customer.

Another object of this invention is to provide a cone shield made of paper or other flexible material formed with a minimum amount of said material and substantially without waste.

Still a further object of this invention is to provide a new and improved method and apparatus of producing cone shields of the character described. Other objects will appear hereinafter.

In accordance with this invention pastry cones are provided having in combination therewith a protecting shield adapted to fit in such engagement with the outside of said cones that said combined cone and shield may be stacked in nested relationship with other similarly combined cones and shields and may be removed from said stacked, nested relationship without disengaging the shields from their respective cones. Additionally, in accordance with the preferred embodiments of this invention said shields are so formed and engaged with said cones as to be readily strippable therefrom by hand without breaking or destroying the cone.

The cone shields forming the subject of this invention are generally frusto-conical in form with converging side walls generally conforming to the side walls of the pastry cone which they are adapted to engage. Frusto-conical shields of the character described are preferably formed from paper or other suitable flexible materials from blanks comprising opposite curved sides of the same radii of curvature, one of said sides being a convex side and the other a concave side. By cutting the blanks from a continuous strip of paper along lines of the same radii of curvature, cone shields may be formed which are eminently suitable for the purpose of this invention and substantially without waste. In accordance with the preferred embodiments of this invention the centers of radii of curvature of the convex and concave sides of the blank from which each cone shield is formed are preferably spaced apart on a straight line joining the centers a distance less than the radius of curvature. Furthermore, each of said blanks preferably has a portion of the concave side cut away adjacent the line joining the centers of the radii of curvature of the curved side, as more fully hereinafter described.

Other features and advantages of the invention will appear from the following description thereof in conjunction with the accompanying drawing, in which Figure 1 illustrates the formation of a combined pastry cone and shield in accordance with this invention;

Figure 2 is a plan view of the cone shield illustrated in Figure 1;

Figure 3 is a view illustrating the manner in which cone shields are formed successively from a strip of paper in accordance with this invention;

Figure 4 illustrates a modified method of forming cone shields in accordance with this invention; and Figure 5 is a side view of a cone shield formed in accordance with the method of Figure 4.

As illustrated in Figure 3, a continuous strip of paper 2 from a roll or the like may be advanced in the general direction of the arrow into the orbit of a conical former or mandrel 4 to form cone shields directly with very little waste. The formation of said shields is generally illustrated by blanks A and B. Mandrel 4 is adapted to roll over an end portion of paper strip 2 which in turn is supported by any smooth cooperating surface, as will be readily understood by those skilled in the art. Mandrel 4 is provided with a cutting edge 6 which cooperates with any other suitable cutting edge in the supporting surface for strip 2.

As mandrel 4 rotates counterclockwise in its orbit, strip of paper 2 is successively severed along arcuate lines 8, 10 and 12. In the first severing operation the leading edge of the paper 14 is removed and in this operation the former does not grip the paper. In all succeeding operations, however, the former 4 grips the leading edge of the paper and starts to wind it into a cone shield. Thus, the paper is gripped by the former adjacent edge 16, the paper in area 18 preferably having been previously removed by clipper knives or in any other suitable manner in order to avoid a sharp point within the cone shield.

As former 4 continues to roll in its orbit after gripping the paper adjacent edge 16, it begins a severing operation at point 20, forming an arc 10 as it continues to roll in its orbit and by the time the former reaches point 22 a cone shield is completely formed. The under side of the paper in proximity to edge 16 is overlapped by adhesive area 24 and thus, an overlapping glued seam is formed. While conical former 4 is rolling over portion A of paper strip 2, the remainder of paper strip 2 which is fed from a roll is temporarily prevented from advancing into the orbit of mandrel 4. If desired, feeding of paper strip 2 may be temporarily stopped while the shield is being formed on the end of the strip or any suitable means may be employed to take up the slack while the paper is continuously fed from a roll.

As soon as former 4 has completely formed or wound a cone shield on the end of the paper strip and severed it therefrom, said shield is discharged from the former while the former continues to move in its orbit. The discharging operation may be effected by a rubber roll adapted to engage the exterior of the shield at the proper time or in any other suitable manner. Before the former 4 again reaches the leading edge of paper strip 2, the paper strip is advanced into the orbit of the former in position for another forming and severing operation similar to that previously described.

As previously indicated, prior to the time that the former 4 engages the leading edge of strip 2 or simultaneously with the winding operation it is preferable to remove or cut away the areas generally indicated at corner portions 18 and 26. Likewise, in order to produce a cone shield having the general appearance and configuration shown in Figures 1 and 2 it is preferable either prior to or during the forming operation to cut away portions of the paper strip generally illustrated by areas 28 and 30. This may be accomplished either by clipper knives in any suitable manner, as for example, by using knives which are adapted to be depressed into the surface of the cooperating paper supporting member as former 4 rolls over said surface, or by a suitable knife provided on former 4 adapted to cooperate with a cutting edge in the supporting member for paper sheet 2.

It will be understood that other means for removing or cutting away the areas 28 and 30 may be employed.

As illustrated in Figure 3, blank A from which the first cone shield is formed in the manner previously described comprises arcuate edges 8 and 10 having the same radii of curvature and parallel side edges 32 and 34. Intersecting edges 8 and 32 is an edge 36 which is concentric with edge 10, that is to say, which has the same center for its radius of curvature.

In a similar manner the next cone shield is formed from a blank B having a lower concave edge made up of a portion of arc 10 and an arc 38 and an upper convex edge made up of an arc 12 as well as straight side edges 40 and 42, the adhesive area being generally indicated at 44, and a corner area 26 being cut off along an edge 46.

It is to be noted that arcs 8, 10 and 12 all have the same radii of curvature with their centers of radii of curvature on the same straight line indicated by center line C—C. Thus, the center of arc 8 is at point 48, the center of arc 10 at point 50 and the center of arc 12 at point 52. These arcs are spaced along center line C—C distances illustrated by the distance from 48 to 50 and from 50 to 52, which distances, for the purpose of the present invention, are preferably less than the radius of curvature of said arcs. Since the upper edge of each blank coincides substantially with the lower edge of each succeeding blank all of the cone shields are formed substantially without waste. Those portions of the lower edges of blanks A and B formed by lines 36 and 38 are concentric with arcs 10 and 12, respectively. Thus, arc 36 has its center at the same center 50 as arc 10, and arc 38 has its center at the same center 52 as arc 12. This arrangement produces a cone shield such as is generally illustrated in Figure 1, in which the top formed from arc 10 is substantially parallel with the bottom formed from arc 36 of blank A.

Each shield as illustrated in Figure 1 is designed to fit closely and snugly to a pastry cone generally indicated by outline 54 of Figure 1. As shown, the side walls of the shield converge in generally the same direction as the side walls of the pastry cone and between the cone and the shield in space 56 an adhesive medium is preferably applied of such character and in such amount as to hold the shield in close engagement or attachment to the cone so that each cone with its respective shield may be nested with other combined cones and shields one within the other and may be removed from such nested relationship without removal of the shield from its cone. At the same time the engagement between the shield and the cone should be such as to permit stripping or tearing of the cone shield from its pastry cone by the user or consumer without destroying the cone. In order to accomplish this various types of adhesive media may be employed, as, for example, those having a base of sugars, dextrins, gums or starches, or mixtures thereof. In forming the shields, the amount of adhesive in area 24 may be varied. Likewise, the character of the adhesive may be varied in order to obtain the desired result. In some cases it is desirable to use a crystallized adhesive either to hold the shield in engagement with the pastry cone, or to form the glued seam of the shield, or both. By a crystallized adhesive is meant an adhesive preferably of the vegetable type which becomes more or less crystallized when allowed to set. By using such an adhesive in area 24 of a cone shield formed from blank A, for example, it is possible to separate the glued seam of the shield and readily strip the blank from engagement with a pastry cone merely by a hand pull. At the same time, the adhesive has sufficient tenacity to hold the seam of the shield together under ordinary conditions of usage and handling.

Another form of the invention is illustrated by Figure 4 in which cone shields are formed and severed from a strip 2' along lines 8', 10' and 12' having the same radii of curvature with their centers on the same straight line. Prior to the formation of cone shields from strip of paper 2', glued areas 24' and 44' are applied to the strip as described in connection with Figure 3. Each cone shield is formed from a blank having parallel straight edges 32' and 34', and 40' and 42'. As shown, portions of the corners of each blank in areas 26' and 18' are cut away, forming straight portions 16' and 46'. The essential difference between this type of blank and that illustrated in Figure 3 resides in the provision of straight edged cut away portions 36' and 38' caused by the removal of areas 28' and 30'.

As shown in Figure 5, this has the effect of producing a frusto-conical shield in which the lower edge lies substantially in a plane which is oblique to the upper edge. As shown in Figure 5, lower edge 36' extends at an angle to upper edge 10' and if projected would intersect said edge. This type of cone shield may be attached to a pastry cone in a manner similar to that described with respect to Figure 1.

According to the description previously given, the cone shields are formed by rolling the mandrel 4 in a counterclockwise direction. Alternatively, the mandrel may be moved in its orbit in a clockwise direction in which case the adhesive areas are either placed on the under side of the paper strip rather than the top side, as shown in the drawing, or are placed on the top side but adjacent the right hand edge rather than the left hand edge of the strip. For instance, by placing the adhesive on the top side of blank A in Figure 3 in proximity to the right hand edge and rolling the cone in a clockwise direction, a cone shield is formed in which edges 8, 16 and 34 are on the outside of the shield overlapping edge 32. In this way edge 16 and the area adjacent thereto which is preferably free of adhesive can be used as a pull flap to pull the shield apart and remove it from the pastry cone. It might be noted at this point that it is preferable in accordance with our invention that the character and amount of adhesive material employed in forming the cone shield and in securing the cone shield to the pasty cone be such that the cone shield may be readily opened and stripped from the cone without tearing the paper.

It will be understood that many variations may be made without departing from the invention. The invention, in its broader aspects, is not limited to any particular method of establishing engagement between the cone shield and the pastry cone. Instead of having an adhesive bond between the pastry cone and its shield a number of other methods of securing the proper engagement may be employed, as, for example:

1. Mechanical perforations in the body of the cone shield which will have a tendency to catch on the grooved surface of the cone.
2. A shoulder at the top of the cone shield that serves to grip a ridge near the top of the pastry cone.
3. Special forms of the pastry cone itself so that the cone shield can be more or less snapped into place.
4. The use of flexible paper, such as crepe paper, in making the cone shields.
5. Humidifying the paper from which the cone shields are made. This serves to stretch the paper so that as it dries it will shrink to the cone. It is interesting to note that pastry cones as they cool off absorb moisture and consequently expand. This method, therefore, provides for engagement between the cone and the shield both by expansion of the cone and contraction of the shield.
6. Wetting the outside of the cone or the inside of the shield. The wafer from which the cone is made tends to become sticky when the cone is wet.
7. Preparing the shield on the inside with wax or other thermoplastic material that will soften when it comes into contact with the hot cone and will cause the shield to adhere when the cone cools.
8. The use of a paper in forming cone shields that is very rough on one side and smooth on the other so that the rough side will adhere to the cone and the smooth or outer side will not catch on a succeeding cone when the combined cones and cone shields are stacked in nested relationship.

The cone shields are preferably made of paper, but other types of flexible sheet materials or molded pulped materials, including regenerated cellulose sheet materials, cellulose acetate materials or other transparent or translucent materials may be employed.

According to the methods just described, the cone shields are preferably applied to the hot pastry cones after they leave the baking molds or the trimming mechanism and before they are stacked in nested relationship. It will be understood, however, that cone shields may be applied to the pastry products before they are baked. Furthermore, the cone shields need not be preformed. Instead the blanks may be cut and formed into a shield at the same time that the pastry cones are formed.

Having thus described the invention, what we claim as new and desire to secure by Letters Patent of the United States is:

1. A blank of sheet material for forming frusto-conical shields comprising opposite curved sides of the same radii of curvature and opposite straight parallel sides, one of said curved sides being a convex side and the other a concave side, said blank having a portion of the concave side cut away adjacent a line joining the centers of the convex and concave sides and being adapted to form a frusto-conical shield in which the edge of the opening at the smaller end lies in substantially the same plane.

2. A sanitary frusto-conical shield formed from a blank of sheet material of generally tapering configuration having opposite curved sides, one of said sides being an upper side comprising a convex arc and the other a lower side comprising a concave arc of the same radius of curvature as said convex arc, said shield being formed with the convex arc forming the periphery of the larger end of the shield and the concave arc extending from the smaller end of the shield and in part defining an overlap.

3. A sanitary frusto-conical shield formed from a blank of sheet material having opposite curved sides, one of said sides being an upper side comprising a convex arc and the other a lower side comprising a concave arc of the same radius of curvature as said convex arc and a portion cut away adjacent a line joining the centers of the radii of curvature of said arcs, the convex arc forming the periphery of the larger end of the shield, the edge of said cut away portion forming at least a part of the periphery of the smaller end of the shield and the concave arc forming at least a part of an overlapping seam in the side wall of the shield.

4. A sanitary frusto-conical shield formed from a paper blank having opposite curved sides, one of said sides being an upper side comprising a convex arc and the other a lower side comprising a concave arc of the same radius of curvature as said convex arc and an arcuate portion in the lower side concentric with said convex arc of the upper side and adjacent a line joining the centers of the radii of curvature of said convex and concave arcs, the convex arc forming the periphery of the larger end of the shield, the concentric arc forming the periphery of the smaller end of the shield and the concave arc forming a part of the overlapping seam in the side wall of the shield.

5. A sanitary frusto-conical shield formed from a paper blank having opposite curved sides, one of said sides being an upper side comprising a convex arc and the other a lower side comprising a concave arc of the same radius of curvature as said convex arc and a straight edge arranged to intersect the concave arc in the lower side, and a line joining the centers of the radii of curvature of the convex and concave arcs, the convex arc forming the periphery of the larger end of the shield, the straight edge forming at least a portion of the periphery of the smaller end of the shield and the concave arc forming at least a portion of the overlapping seam in the side wall of the shield.

6. A sanitary frusto-conical shield formed from a paper blank having opposite curved sides and opposite parallel straight sides, one of said curved sides being an upper side comprising a convex arc and the other of said curved sides being a lower side comprising a concave arc of the same radius of curvature as said convex arc and including a portion cut away adjacent a line joining the centers of the radii of curvature of said convex and concave arcs, one of said parallel sides substantially coinciding with said line, at least a part of the convex arc forming the periphery at the larger end of the shield, the edge of said cut away portion forming at least a part of the periphery at the smaller end of the shield, and the edge substantially coinciding with the line joining the centers of radii of curvature of the convex and concave arcs defining in part an overlapping seam in the side wall of the shield, said overlapping seam also being defined in part by said concave arc and by the other parallel straight side.

7. A sanitary frusto-conical shield formed from an unsymmetrically shaped blank of generally tapering configuration and comprising a body portion and an overlap portion with the wider part of the tapered blank forming the body portion of the shield and the narrower part forming an overlap, the taper of said blank being defined in part by an upper curved side comprising a convex arc and in part by a lower curved side comprising a concave arc of the same radius of curvature as said convex arc, the periphery of the larger end of the shield being formed from at least a part of said convex arc and the overlap being defined in part by at least a portion of the concave arc.

8. A sanitary frusto-conical shield as claimed in claim 7 in which the overlap defined in part by the concave arc is on the outer surface of the shield and serves as a pull flap which may be grasped to pull the shield apart.

9. A blank of flexible sheet material for forming a frusto-conical protective shield, said blank being of generally tapering configuration and including a body portion and an overlap portion defined at least in part by opposite curved sides of the same radii of curvature, one of said curved sides being convex and the other concave, the area defined by the wider part of said taper being adapted to form the side walls of said shield and the area defined by the narrower part of said taper being adapted to lie in overlapping relationship with said body portion, at least a portion of the convex side being adapted to form the periphery of the larger end of the shield and at least a portion of the concave side being adapted to define in part the overlap portion.

10. A blank of sheet material for forming frusto-conical protective shields, said blank being of generally tapering configuration and comprising opposite curved sides of the same radii of curvature, one of said sides being a convex side and the other a concave side with the centers of radii of curvature of said sides spaced apart at a straight line joining their centers a distance less than the radius of curvature, said convex side being adapted to form the periphery of the larger end of the shield and at least a portion of said concave side being adapted to define in part an overlap in the side wall of the shield.

11. A blank of flexible sheet material for forming a flexible frusto-conical shield, said blank having opposite curved sides, one of said sides being an upper side comprising a convex arc and the other a lower side comprising a concave arc of the same radius of curvature as said convex arc and a portion cut away adjacent a line joining the centers of radii of curvature of said arcs, the convex arc being adapted to form the periphery of the larger end of the shield, the edge of said cut away portion being adapted to form at least a part of the periphery of the smaller end of the shield and the concave arc being adapted to form at least a part of an overlapping seam in the side wall of the shield.

WALTER E. AMBERG.
ARTHUR S. BOWES.
STEPHEN W. AMBERG.